(12) United States Patent
Young

(10) Patent No.: US 9,170,269 B1
(45) Date of Patent: Oct. 27, 2015

(54) WEATHERVANE FOR INDICATING WIND DIRECTION

(71) Applicant: Bert C. Young, Lake Bluff, IL (US)

(72) Inventor: Bert C. Young, Lake Bluff, IL (US)

(*) Notice: Subject to any disclaimer, the term of this patent is extended or adjusted under 35 U.S.C. 154(b) by 164 days.

(21) Appl. No.: 14/162,728

(22) Filed: Jan. 23, 2014

(51) Int. Cl.
  *G01P 13/00* (2006.01)
  *G01F 15/00* (2006.01)
  *G01P 13/02* (2006.01)

(52) U.S. Cl.
  CPC ...................... *G01P 13/02* (2013.01)

(58) Field of Classification Search
  None
  See application file for complete search history.

(56) References Cited

U.S. PATENT DOCUMENTS

| | | | | |
|---|---|---|---|---|
| 2,435,106 A * | 1/1948 | Stilwell, Jr. | ................ | 73/170.08 |
| 3,732,730 A * | 5/1973 | Kwolek | ..................... | 73/170.05 |
| 3,986,396 A * | 10/1976 | Raymond | ................. | 73/170.07 |
| 4,454,757 A * | 6/1984 | Weinstein et al. | ......... | 73/170.11 |
| 4,597,287 A * | 7/1986 | Thomas | ..................... | 73/170.03 |
| 4,665,744 A * | 5/1987 | Smith | ........................ | 73/170.17 |
| 5,038,607 A * | 8/1991 | Baer et al. | ................... | 73/170.11 |
| 5,361,633 A * | 11/1994 | Peet, II | ..................... | 73/170.08 |
| 5,469,738 A * | 11/1995 | Hendrickson | .............. | 73/170.07 |
| 5,811,673 A * | 9/1998 | Kwok et al. | ............... | 73/170.05 |
| 6,046,679 A | 4/2000 | Cosyns | | |
| 7,310,047 B2 * | 12/2007 | Al-Wehebi | .................... | 340/632 |
| 7,516,657 B2 * | 4/2009 | Fan | .......................... | 73/170.01 |

OTHER PUBLICATIONS

Weather vane products from http://www.gooddirections.com.
Weather vane products from http://www.weathervanefactory.com.
Weather vane products from http://www.whitehallproducts.com.

* cited by examiner

*Primary Examiner* — Peter Macchiarolo
*Assistant Examiner* — Jermaine Jenkins
(74) *Attorney, Agent, or Firm* — Depeng Bi; Law Offices of Konrad Sherinian (57) ABSTRACT

A weathervane includes a vane and a wind direction display roller. Driven by wind force, the vane rotates the display roller through a motion transfer system. The display roller includes a plurality of wind direction indicators. The weathervane further includes a housing that receives the display roller. The housing includes an opening through which one or more direction indicators are visible.

12 Claims, 6 Drawing Sheets

WEATHERVANE FOR INDICATING WIND DIRECTION

FIELD OF THE DISCLOSURE

The present disclosure relates to a weathervane, and more particularly relates to a weathervane that indicates wind direction with one or more colors. More particularly still, the present disclosure relates to a weathervane that indicates wind directions with colors and letters on a display roller.

DESCRIPTION OF BACKGROUND

Weathervanes are commercially available wind direction indication devices. They are constructed in different shapes and forms. Conventional weathervanes usually include the four well known cardinal direction symbols N, W, S and E to represent North ("N"), West ("W"), South ("S") and East ("E") directions respectively. The symbols N and S are mounted to two opposite ends of one rod, while the symbols W and E are mounted to two opposite ends of another rod. The two rods are at a right angle to each other. After installation, the direction symbols point to the right directions and are stationary.

A conventional weathervane further includes a figure for the purposes of both decoration and wind direction indication. The figure usually lines up with a pointing device, such as an arrow. When wind blows, the figure rotates and adjusts itself to the direction of wind. A user then determines the direction of wind by checking the angle of the pointing device relative to the four cardinal direction symbols. For example, when the pointing device is between the symbols N and E, and at an angle of 45° (meaning 45 degrees) from the rod linking the symbols E and W, the wind direction is northeast.

When checking the conventional weathervane from afar (such as thirty feet or more), the user cannot easily determine the wind direction with accuracy. The source of this problem is the user's perspective in relation to the weathervane. Even when the user is in a very close proximity, such as within a few yards, of the conventional weathervane, he may still have trouble reading the wind direction with accuracy. For example, the user likely cannot discern the wind direction with convenience and accuracy unless he moves his person right in front of or behind the pointing device to determine the angle of the pointing device relative to the direction symbols. Electric weathervanes have been developed. However, they present a new set of problems. For example, they require batteries or have to be connected to an external power source. Batteries have to be regularly replaced and are expensive.

Accordingly, there is a need for a weathervane that is accurate in indicating wind direction, less expensive and convenient to install and read.

OBJECTS OF THE DISCLOSED SYSTEM, METHOD, AND APPARATUS

An object of this disclosure is to provide an improved weathervane.

An object of this disclosure is to provide an improved weathervane that accurately indicates wind direction to a user.

An object of this disclosure is to provide an improved weathervane that is easy to read.

An object of this disclosure is to provide an improved weathervane that indicates wind direction using one or more colors.

An object of this disclosure is to provide an improved weathervane that accurately indicates wind direction to a user who is far away from the weathervane.

An object of this disclosure is to provide an improved weathervane that indicates wind direction using cardinal direction symbols.

Other advantages of this disclosure will be clear to a person of ordinary skill in the art. It should be understood, however, that a system, method, or apparatus could practice the disclosure while not achieving all of the enumerated advantages, and that the protected disclosure is defined by the claims.

SUMMARY OF THE DISCLOSURE

Generally speaking, pursuant to the various embodiments, the present disclosure provides a weathervane. The weathervane includes a housing mounted to a supporting member. The housing includes an opening. Additionally, the weathervane includes a wind direction display roller enclosed by and rotatably mounted to the housing. The display roller comprises a plurality of wind direction indicators. At least one of the plurality of wind direction indicators is visible through the opening. The weathervane further includes a vane, and a motion transfer system operatively coupled to the vane and the display roller. The display roller is rotated by the vane through the motion transfer system.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views. Elements in the drawings are not necessarily drawn to scale. Additionally, the detailed description and drawings do not necessarily require the order the elements are illustrated. Moreover, for simplicity and clarity of illustration, common and well-understood elements to those skilled in the art may not be depicted for simplicity and clarity of illustration.

DETAILED DESCRIPTION OF THE ILLUSTRATED EMBODIMENT

Figure 1:
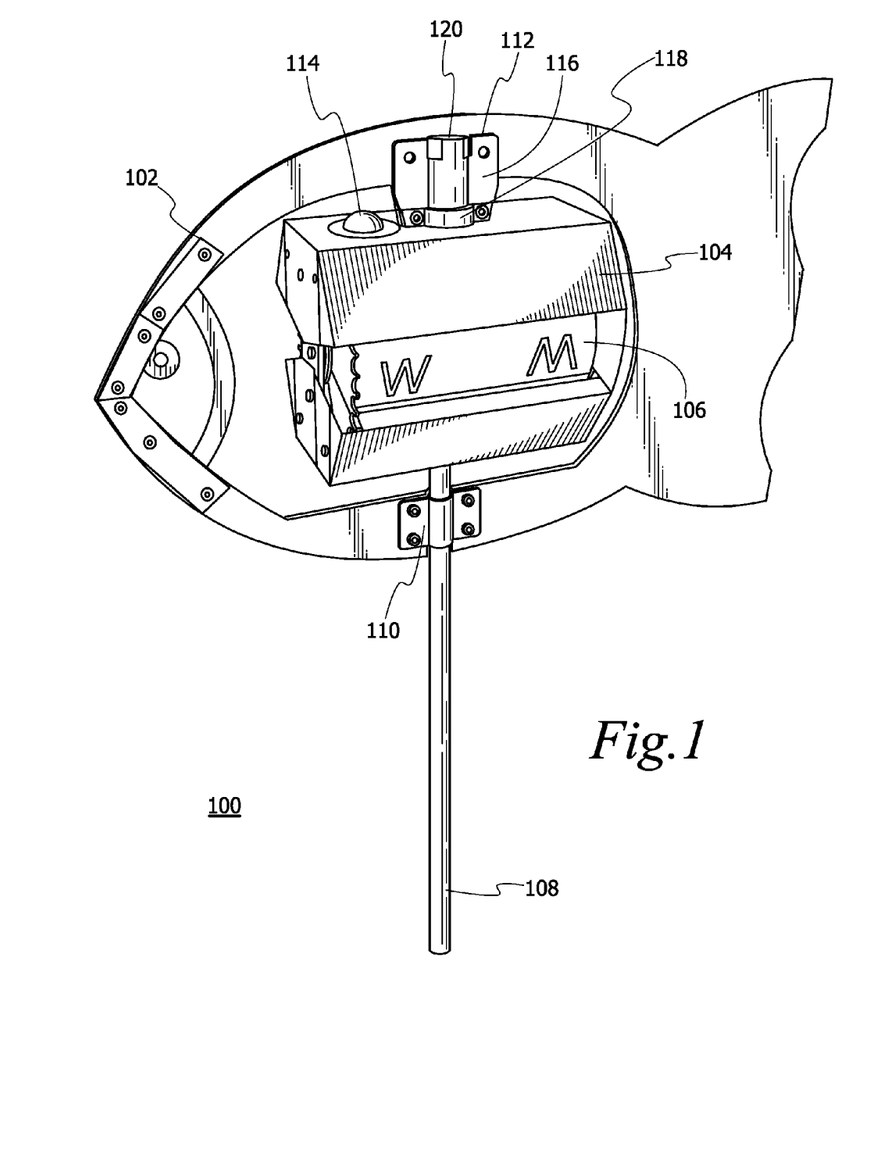
FIG. 1 is a perspective view of a weathervane in accordance with this disclosure.

Turning to the Figures and to FIG. 1 in particular, a weathervane in accordance with the present teachings is indicated and shown at 100. The weathervane 100 includes a vane 102 and a roller 106 (also referred to herein as display roller) that is partially enclosed inside a housing 104. The weathervane is mounted onto a post 108 which functions as a supporting device. To install the weathervane 100, a user of the weathervane 100 can mount the post 108 onto a structure. Alternatively, the user can embed the lower portion of the post 108 in a pot of concrete to allow the post 108 to extend vertically from the ground and be firmly affixed to the ground.

Driven by wind, the vane 102 pivots around the post 108, and points towards the direction that wind is coming from. In one implementation, the vane 102 rotates around the post 108 through a bracket enclosure 110. As the vane 102 pivots around the post 108, it rotates the roller 106 through a driver gear assembly (also referred to herein as a motion transfer system). The driver gear assembly is operatively coupled to the vane 102 through a keyed vane mount 112. The keyed vane mount 112 is affixed to and rotates along with the upper frame of the vane 102. As a wind direction display device, the roller 106 indicates the present wind direction, such as west, southwest, etc. The roller 106 is further illustrated by reference to FIG. 2.

Figure 2:
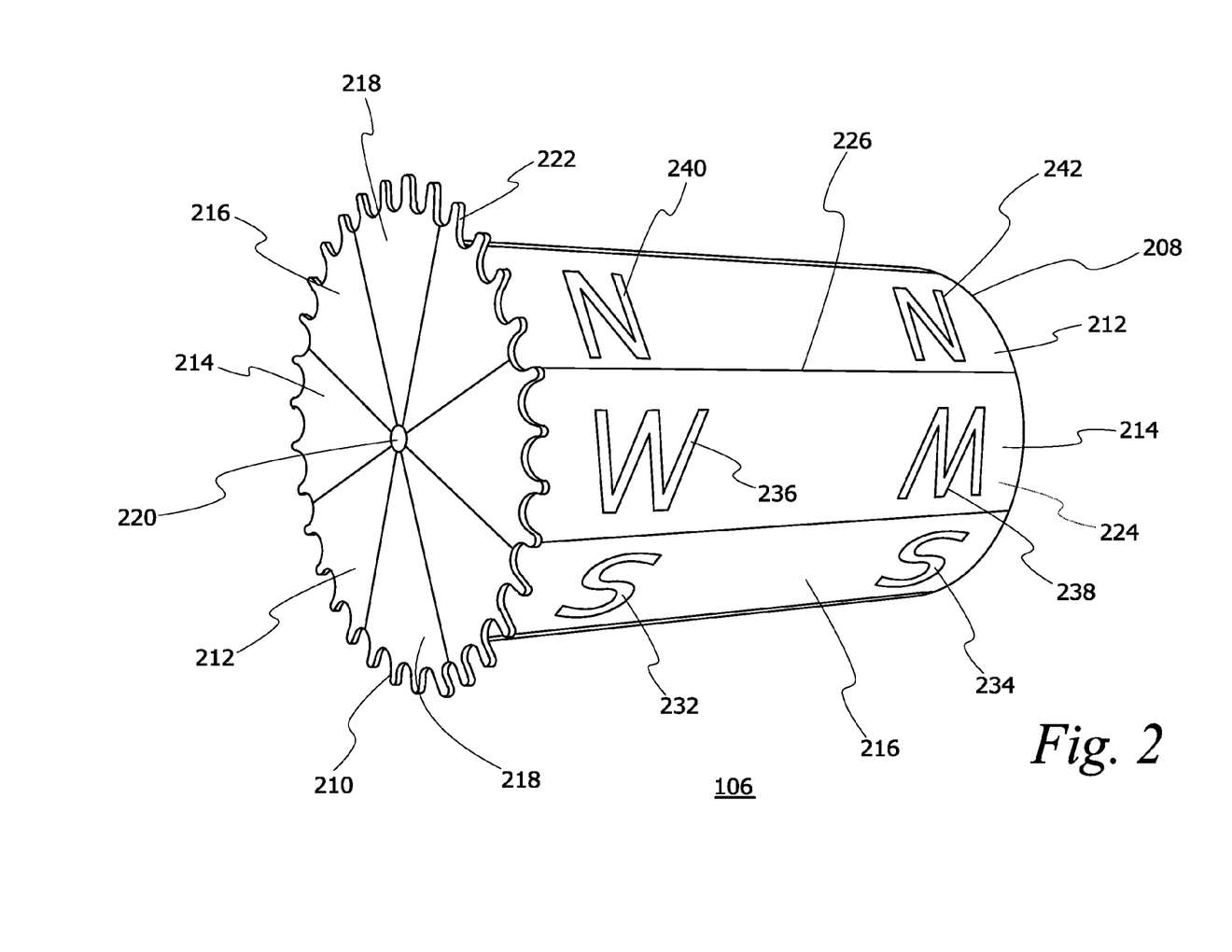
FIG. 2 is a perspective view of a roller of a weathervane with a set of wind direction indicators in accordance with this disclosure.

Turning now to FIG. 2, the roller 106 includes a roller gear 210 and a roller cylinder 208 that are concentrically affixed to each other. The roller 106 further includes an axle tube 220 which extends longitudinally through the full length of the centers of the roller gear 210 and roller cylinder 208. Alternatively, an aperture extending longitudinally through the full length of the centers of the roller gear 210 and roller cylinder 208 achieves the same function of the axle tube 220. The length of the axle tube 220 or the aperture is at least the sum of the thickness of the roller gear 210 and the length of the roller cylinder 208. The roller gear 210 includes a plurality of teeth 222 that are evenly distributed on the outer edge of the roller gear 210. In one implementation, the number of the teeth 222 is thirty-two (32).

The display roller 106 includes eight direction indicators 212, 214, 216, 218. The two direction indicators 212 indicate the cardinal direction North; the two direction indicators 214 indicate the cardinal direction West; the two direction indicators 216 indicate the cardinal direction South; and the two direction indicators 218 indicate the cardinal direction East. In one embodiment, the eight direction indicators 212, 214, 216, 218 are painted and shown in different colors. For example, the direction indicators 212 are blue, the direction indicators 214 are red, the direction indicators 216 are green, and the direction indicators 218 are yellow. The eight direction indicators 212, 214, 216, 218 are evenly distributed on the surface of the display roller 106.

Eight longitudinal joint lines between the direction indicators 212, 214, 216, 218 divide the entire circumference of the roller cylinder 208 into eight equal longitudinal sections. Additionally, the eight direction indicators 212, 214, 216, 218 are shown on the outer surface of the roller gear 210 on one end of the roller cylinder 208. As used herein, the outer surface of the roller gear 210 is also referred to as a side surface of the display roller 106. Moreover, the eight direction indicators 212, 214, 216, 218 are also shown on a side surface 224 of the roller cylinder 208.

For example the joint line between the direction indicator 212 and 214 extends to the center of the roller gear 210 on the outer surface of the roller gear 210, and the center of the roller cylinder 208 on the side surface 224. On both the outer surface of the roller gear 210 and the side surface 224, the angle between any two adjacent joint lines of the direction indicators is 45°. The colored surface of the roller gear 210 and the side surface 224 make the direction indicators 212,214,216, 218 visible from any directions, such as front, back, left and right. In one implementation, each of the direction indicators 212,214,216,218 is marked with two cardinal direction symbols one of which is upside down. For example, the symbol W 236 is shown in a normal orientation while the symbol W 238 is illustrated in an upside down orientation. When viewed from a front direction, the symbol W 236 indicates the direction West. However, when viewed from an opposite direction, the symbol W 238 indicates the direction West. Similarly, the symbol Ss 232,234 and the symbol Ns 240,242 are illustrated in opposite directions respectively. It should be noted the symbol Es are not visible in the illustrative drawing of FIG. 2.

In one embodiment, the axle tube 220 is an aluminum tube with an outside diameter ("OD" or "O.D.") of 9/32" (meaning 9/32 inches). The inside diameter ("ID" or "I.D.") of the axle tube 220 is such that it receives a roller axle 304 of ¼" in diameter with a close yet non-binding fit. In one implementation, the roller axle 304 is aluminum. Additionally, in this embodiment, the thickness of the roller gear 210 is 1/16". It is desirable to use stable, lightweight, easily formable, and low cost material to construct the roller cylinder 208. In this embodiment, extruded polystyrene foam board is used to construct the roller cylinder 208. To make an adequately sized roller cylinder 208 of suitable length and diameter, three cylinder discs are hole-sawn from two-inch thick polystyrene foam board using a four-inch diameter hole-saw producing circular polystyrene discs measuring close to 3¾" in diameter that when bound together by their flat sides with their circumferences concentric will produce a cylinder of 6" in length and 3¾" in diameter. The pilot bit of the hole-saw automatically produces a hole marking the center of the diameter of the discs. To bind the three cylinder discs into a single cylinder form, one end of the axle tube 220 is inserted through the center hole of the first disc.

An adequate amount of a compatible, outdoor grade adhesive or glue is then applied to coat the inner side of the first disc. After the axle tube 220 is inserted through the center hole of the second disc, the second disc is then pressed into position and affixed to the first disc. This process is repeated to bind the third disc to the second disc to form an unfinished roller cylinder 208. The unfinished roller cylinder should be lightly clamped or weighted until the adhesive cures. In this embodiment, the unfinished roller cylinder is given a coat of fiber-glass with epoxy resin to firm its shape and provide a protective and paintable surface. Care should be taken, particularly during the fiber-glassing process, to keep the inside of the axle tube 220 clear of any materials that would prevent an easy insertion of the roller axle 304 or cause interference with a free and smooth relative rotation motion between the roller axle 304 and the axle tube 220. As described later, a roller gear 210 is made and fastened to the roller cylinder 208 to complete the unpainted display roller 106. After a test fitting described later the roller 106 is then painted with desirable colors. For better clarity, each of the symbols W, S, E and N is painted using a contrasting color relative to the color of its corresponding direction indicator 212, 214, 216, or 218. For example, the symbols W, S, E and N are painted in color white.

Figure 3A:
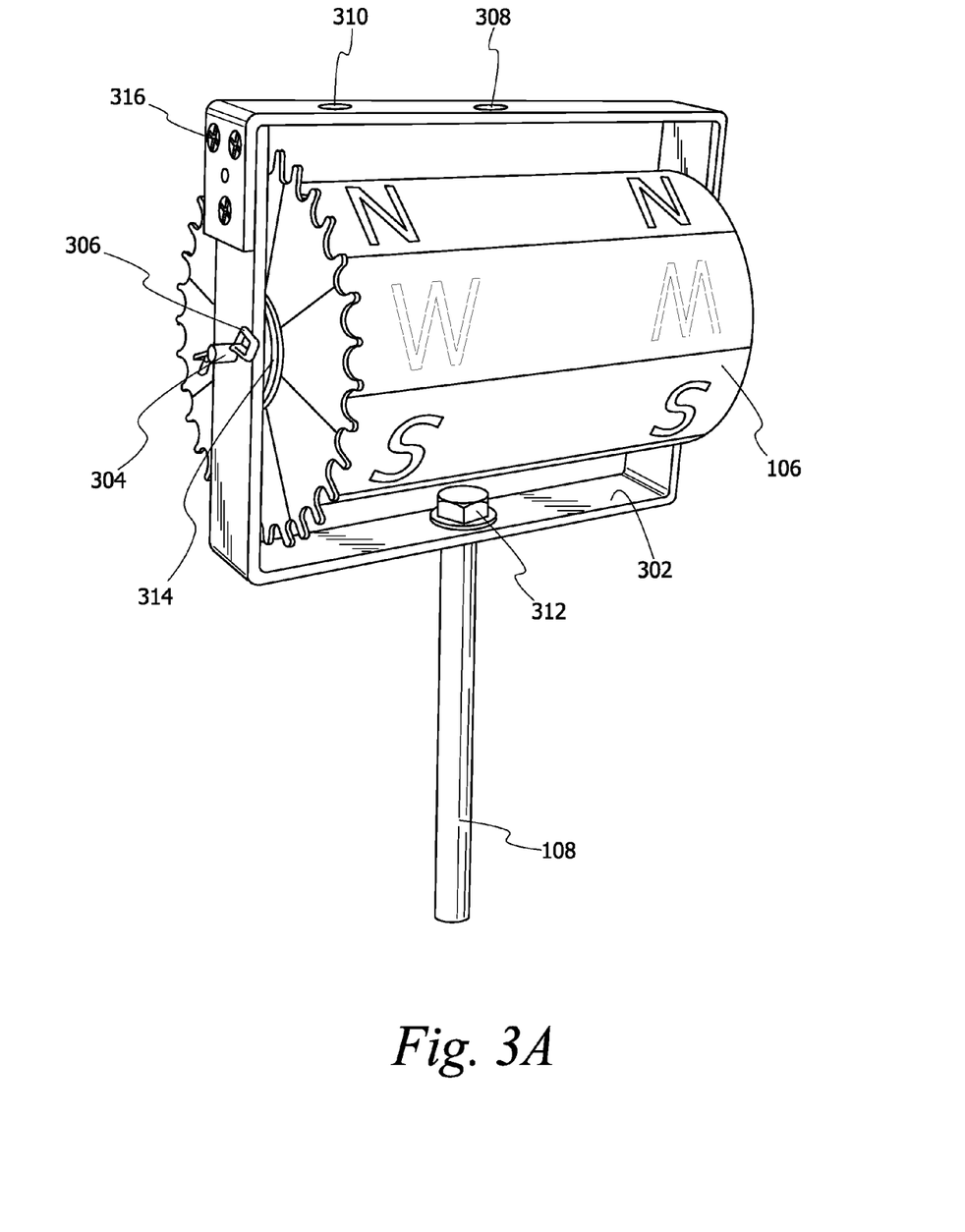
FIG. 3A is a perspective view of a weathervane frame, enclosing a roller, that is mounted onto a weathervane post in accordance with this disclosure.
Figure 3B:
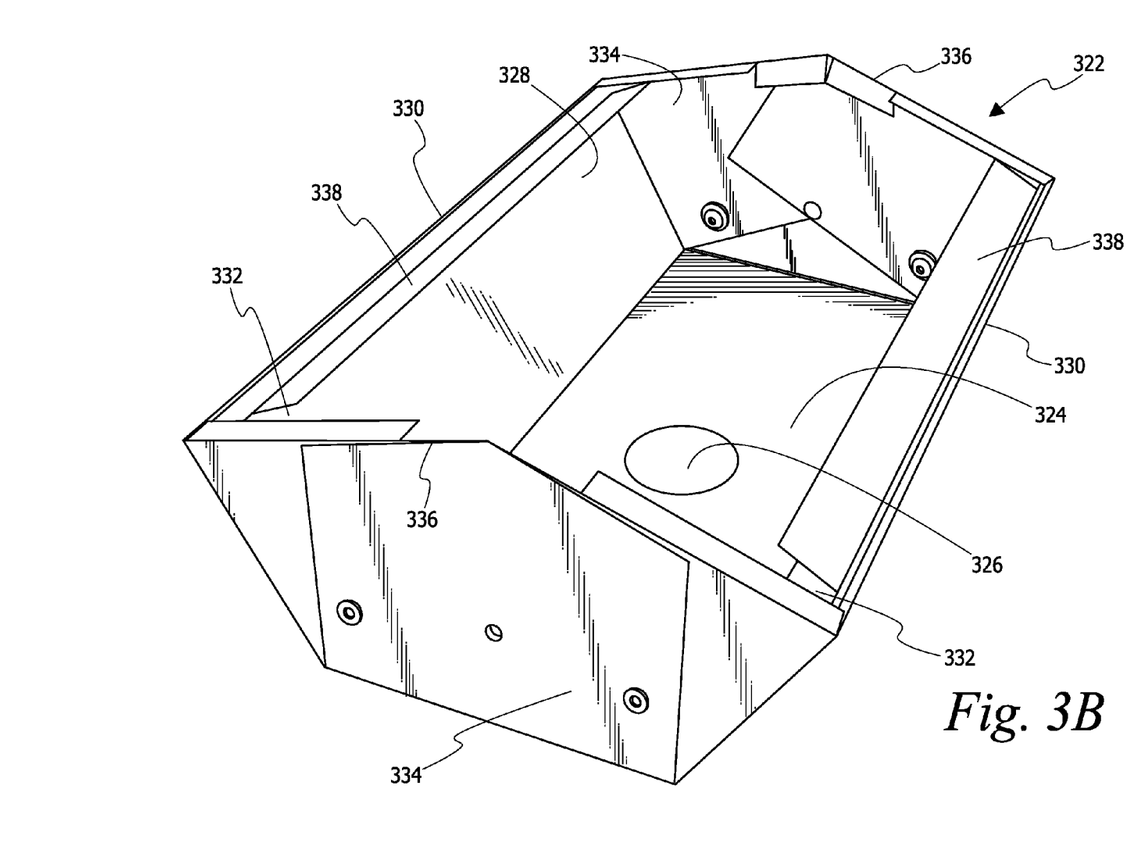
FIG. 3B is a perspective view of a housing top cover of a weathervane in accordance with this disclosure.
Figure 3C:
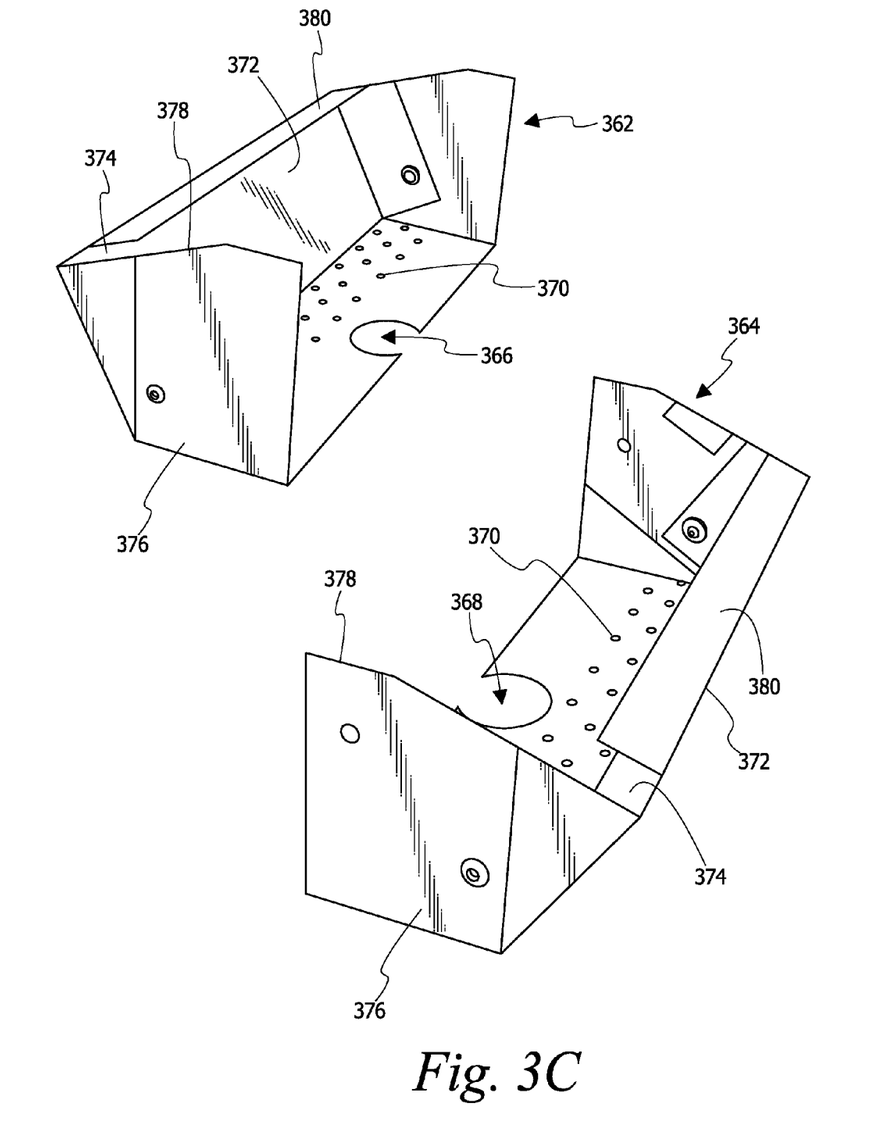
FIG. 3C is a perspective view of two parts of a housing bottom cover of a weathervane in accordance with this disclosure.

The housing 104 protects the roller 106 and the gear assembly from weather conditions, and also forms the display opening for the direction indicators. It can be constructed using a variety of materials, such as gauge galvanized sheet metal. The housing 104 includes a frame 302, a top cover 322 and two bottom covers 362,364 that are shown in FIGS. 3A, 3B, 3C respectively. Turning first to FIG. 3A, the frame 302 is mounted to the post 108. The inside of the top end of the post 108 is tapped at 14 threads per inch to a depth of at least 1⅜" to receive a 7/16" diameter by 1½" long hex-head mounting post bolt 312. The unthreaded shank portion of the mounting post bolt 312 is no more than 5/16". Two lock washers are placed on both the top and bottom surfaces of the frame 302 before the bolt 312 is inserted through a bolt hole on the bottom leg of the frame 302. The bolt 312 is tightened to securely fasten the frame 302 to the mounting post 108. Various other means known to a person skilled in the art can be used to mount or affix the frame 302 to the post 108. For example, the frame 302 can be welded to the post 108.

The top leg of the frame 302 includes two apertures 308 and 310 to receive a threaded shaft 406 and an idler gear axle 412 respectively. Additionally, each of the side legs of the frame 302 includes an aperture to receive the roller axle 304. The roller axle 304 runs through the full length of the axle tube 220. Each end of the roller axle 304 has an aperture to receive a pin 306 for locking the roller 106 to the frame 302. A washer 314 or washers as needed is also mounted on each side of the roller axle 304 between the frame 302 and the roller 106. The roller 106 freely rotates and pivots around the roller axle 304.

In the illustrative embodiment, the frame 302 is formed from a steel flat stock that is 1" wide by 1/8" thick. Alternatively, aluminum, plastic or wood can be used to form the frame 302. In the illustrative implementation, the frame 302 is formed with an upper part and a lower part which are affixed to each other using flathead machine screws. Alternatively, the upper and lower parts are welded together. The frame 302 can also be made as a single piece through, for example, a molding process. It is desirable that the roller 106 and the frame 302 are not in direct contact with each other and there is no less than 1/8" distance between each end of the roller 106 and the adjacent side leg of the frame 302. This distance allows washers to be used to keep the roller 106 from rubbing the frame 302, and also for adjusting the roller 106 laterally to refine the gear meshing between the roller gear 210 and the idler gear 414, if necessary.

Referring FIG. 3B, the top cover 322 is sized and shaped to fit and be attached to the outside of the frame 302, and encloses the upper three direction indicators or radial segments of the roller 106. In the illustrative embodiment, it is formed from a single piece of sheet metal. A top horizontal surface 324 is 2¾" wide and slightly longer than the top leg of the frame 302. The surface 324 has an aperture 326 that aligns with the aperture 308, and receives the splined portion 426 of the splined driver gear shaft 402 The surface 324 further includes an additional aperture (not shown) that aligns with the aperture 310, and receives an idler gear axle 412 with a top nut (not shown) for fastening the axle 412 to the frame 302. The additional aperture is covered by a piece of sheet metal cover 114 formed to fit over the idler gear axle top nut and permanently attached to the top cover 322. In a different implement, instead of a nut to secure an axle, a flathead screw is used as an axle and countersunk into the top leg of the frame 203. In such a case, the metal cover 114 and the additional aperture are not needed.

The two opposite long sides 328 of the cover 322 angle downward and outward at 60 degrees for 2", and then are folded back up against themselves for about 3/16" to form two drip edges 330. Continuing from this approximate 3/16" mark, an approximately 90 degree fold is then made inward for a distance of about a half-inch or as needed to form soffits 338 between the drip edges 330 and the roller 106. The soffits 338 should be close to but not touching the roller 106 when these parts are brought together for operation. The purpose of the drip edges 330 is to allow rain water and snow melt to fall outside the bottom covers 362 and 364. The soffits 338 serve a double purpose of discouraging the entry of insects, and forming an edge for the display opening formed by the top cover 322 with the bottom covers 362 and 364. At one end of each soffit 338 a small cutout 332 is made to clear the roller gear 210. Top edges 336 of two vertical sides 334 of the top cover 322 angle upward on each side at approximately 22.5 degrees to provide visibility to the direction indicators 214, 214,216,218 on two opposite ends of the roller 106.

Referring to FIG. 3C, the bottom covers 362 and 364 are sized and shaped to fit and be attached to the outside of the lower portion of the frame 302, and enclose the lower three direction indicators or radial segments of the roller 106. Alternatively, the bottom covers 362 and 364 are one integral component constructed from, for example, a single piece of sheet metal. The bottom covers 362 and 364 further include a plurality of apertures 370 to prevent accumulation of water inside weathervane 100, and provide ventilation. The bottom surfaces of the bottom covers 362 and 364 overlap each other on the bottom leg of the frame 302. Two circular cutouts 366 and 368 overlap and fit closely around the post 108. One of the bottom covers 362 and 364 is about 1/16" longer than the other one to accommodate the overlapping length.

The long sides 372 of the bottom covers 362 and 364 rise up and outward from the plane of the bottom surfaces of the bottom covers 362 and 364 at an angle of 60 degrees for approximately 2". Moreover, approximately 5/8" of the top edges of the longs sides 372 are folded inward towards the roller 106 to form sills 380 at angle of about 90 degrees relative to the long sides 372. Additionally, at one end, the sills 380 have two cutouts 374 to clear the roller gear 210. The sills 380 angle upward from the long sides 374 to shed rain water away from the roller 106, as well as forming a distinct lower edge of the display opening. The sills 380 do not make contact with the roller 106. The vertical sides 376 of the bottom covers 362 and 364 extend upward for approximately 2½". The top edges 378 of the vertical sides 376 angles downward to the long sides 372 to provide visibility of the roller 106 from side directions.

The angle by which the top edges 378 extend downward is approximately 22.5 degrees. The angles between the edges 378 and edges 336 are thus 45 degrees. The edges 378,336 and edges of long sides 328,372 form an opening of the housing 104. The opening includes a front portion and a rear portion. The front and rear portions are rectangular in shape. The opening further includes two side portions, each of which includes two sectors with a sector central angle of 45 degrees. The opening provides visibility of a whole direction indicator 214, 214, 216 or 218 from all horizontal directions around the weathervane 100. For example, when the full direction indicator 214 or approximately the full direction indicator 214 is visible, the pointing end of the vane 102 points towards West and wind blows from West to East. In such a case, the indicator 214 is visible from the front, back, left and right sides of the weathervane 100. As an additional example, when approximately half of the direction indicator 214 and half of the direction indicator 216 are visible, the pointing end of the vane 102 points towards Southwest and wind blows from Southwest to Northeast.

The force of wind turns the vane 102. Through a motion transfer system, the rotation motion of the vane 102 rotates the roller 106. In one implementation, the motion transfer system 400, illustrated by reference to FIG. 4, includes a driver gear 404 and an idler gear 414. The driver gear 404 is mounted to a splined driver gear shaft 402 which is received by the aperture 308 in the top leg from the frame 302. In the illustrative embodiment, the number of teeth and diameter of the pitch circle of the driver gear 404 are half of that of the roller gear 210 respectively. Accordingly, the gear ratio (also referred to herein as turn ratio) between the driver gear 404 and the roller gear 210 is 2:1.

Figure 4:
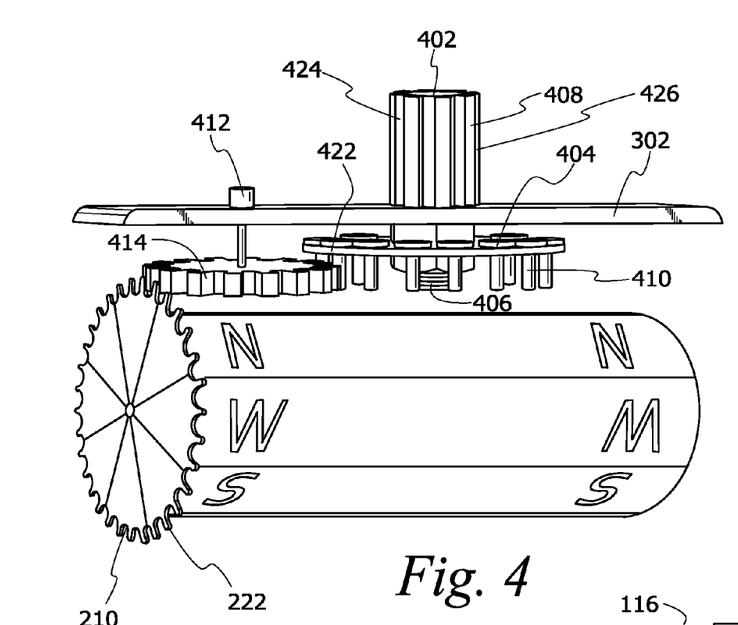
FIG. 4 is a perspective view of a motion transfer system attached to a frame and operatively coupled to roller in accordance with this disclosure.

The idler gear 414 is rotatably mounted to an idler gear axle 412 which is attached to the frame 302. In one implementation the idler gear axle 412 is made from a 3/8" hex-head bolt cut to 7/8" in length with the head ground down to a thickness of 3/16" to maintain a suitable gap between the bolt head and the surface of the display roller 106. The axle 412 is received by the aperture 310 and fixed in the top leg of the frame 302 by a top nut (not shown). The top nut is covered by the sheet metal cover 114 when the top cover 322 is in place. The idler gear 414 is operatively coupled to the driver gear 404 and the roller gear 210. The idler gear 414 and the driver gear 404 and their connecting parts make no physical contact with the surface of the roller cylinder 208. In response to the rotation of the driver gear 404, the idler gear 414 rotates. Similarly, in response to the rotation of the idler gear 414, the roller gear 210 rotates.

In one implementation, the process of making the gears involves firstly, establishing a point on an aluminum sheet material as a center to mark out a circle of the appropriate finished diameter delineating a gear blank. For the roller gear 210, a circle is marked 4 3/4" in diameter delineating a circular gear blank; and a concentric inner circle is marked 4 1/8" in diameter marking the root of the gear teeth 222. The difference in their radii allows 5/16" for the length of the gear teeth 222 with a remaining margin of a strong 1/8". Accordingly, a total of about 1/2" of the roller gear 210 outer radius extends beyond the radius of the roller cylinder 208. With an outer diameter of 4 3/4", the diameter of the pitch circle of the roller gear 210 is exactly or approximately 4 3/8". The pitch circle marks the portion of the gear 210 that makes contact with the adjoining gear. The pitch circle of the gear 210 is described here as the concentric circle on the gear 210 that locates the point on the gear teeth 222 that bears the force transmitted between connecting gears, such as the gears 210 and 414. The pitch circle is of a smaller diameter than the outside diameter of the gear 210, and a larger diameter than the root diameter that marks the root of the gear teeth 222.

Next, a number of diameter lines are marked on the gear blank circle to intersect the circumference of the gear blank circle at equally spaced points around its entire circumference. The number of diameter lines being half the even number of gear teeth 222 is needed. Sixteen evenly spaced diameter lines will mark the location of the thirty-two roller gear teeth 222 that are appropriate for the required 2:1 turn ratio produced when the roller gear 210 is in train with the smaller sixteen tooth driver gear 404. Guiding on the circular line that marks the finished diameter of the roller gear 210, the gear blank can be cut from the sheet. Equally spaced gear teeth 222 of the appropriate length and width can be formed to a workable shape using ordinarily available tools familiar to the skilled artisan. The gear teeth 222 are approximately half as wide as the space between the teeth 222. A hole is then made through the center of the roller gear 210 of a size to fit closely around the axle tube 220. The diameter of the hole is 9/32" to match the 9/32" O.D. of the axle tube 220. The aluminum roller gear 210 and the fiber-glassed roller cylinder 208 are fastened together, using epoxy, by their flat surfaces with their circumferences concentric, completing the formation of the unpainted display roller 106.

The splined driver gear shaft 402 includes a threaded shaft 406 and a splined portion 426 on one end of the threaded shaft 406. The splined portion 426 comprises sixteen parts, namely, eight splines 408 and eight key ways ("keyways") 424. The threaded shaft 406 is a threaded steel rod of 1/2" in diameter and 1 7/8" in length. For convenience in handling the rod, it is desirable to not cut to its finished length until after the splined portion 426 is completed. A rough length of about 8 to 10 inches for the rod is appropriate. To form the splined portion 426 on the splined driver gear shaft 402, a mold is used to form a one inch long cylinder-shaped epoxy slug on one end of the 1/2" threaded steel rod. In the illustrative embodiment, an aluminum tube of one inch in length and one inch of O.D. is used. The tube's inside diameter is 29/32". The tube mold is sealed on one end to form the bottom end of the mold and the inside surface is coated with a release agent such as white grease. With the mold secured in a vertical position the threaded rod is inserted vertically to the full one inch depth of the mold and secured concentrically and vertically.

Liquid epoxy is poured into the mold and allowed to harden so as to form an epoxy cylinder shape around one end of the rod. The mold is removed. The epoxy cylinder shape is one inch in height and 29/32" in diameter. The epoxy cylinder shape is cut longitudinally with eight parallel, equally spaced cuts around its entire circumference to form eight splines 408. Each of the eight cuts is made to be a 1/8" wide and 1/8" deep channel that will act as a keyway 424 for the keyed vane mount 112. The threaded shaft 406 is cut to a length between 13/16" and no more than 7/8" in length. Accordingly, the overall length of the splined driver gear shaft 402 is no more than 1 7/8".

In one implementation, the driver gear 404 is of a crown gear configuration composed of sixteen cylindrical gear teeth 410, one gear blank 422, one nut and brads. The circular gear blank 422 has a diameter of 2 9/16" and constructed from a 1/16" thick aluminum sheet. To construct the driver gear 404, a pitch circle is marked concentrically on the gear blank 422 with a diameter that is half the diameter of the pitch circle of the roller gear 210 to allow the required 2:1 turn ratio. The pitch circle of the driver gear 404 is 2 3/16" in diameter. On the gear blank 422, eight equally spaced diameter lines are marked to intersect the circumference of the gear blank 422 at sixteen equally spaced points. At the points where the diameter lines intersect the pitch circle line, holes are drilled and tapped to receive machine screws with an 8-32" thread-size perpendicular to the plane of the gear blank 422. These screws will act as gear teeth 410. A center hole is drilled of a diameter just large enough to pass the threaded shaft 406 portion of the splined driver gear shaft 402 which is 1/2" in diameter. The gear blank 422 is cut from the aluminum sheet. Sixteen 8-32"×3/8" long machine screws with a round, button or pan type head are threaded in to the gear blank 422 to form the gear teeth 410 and are epoxied in place around the screw heads.

To complete the formation of the driver gear 404, a nut with a thread size matching the threaded shaft 406 is permanently attached concentrically to the gear blank 422 on the side opposite the gear teeth 410. The thickness of the nut is no more than 3/16". A thicker nut may have to be sawn or ground down to achieve an acceptable thickness. In one implementation, four small holes of 1/16" diameter are drilled through the thickness of the nut at roughly equal spacing from each other. With the nut placed concentrically over the center hole on the side of the gear blank 422 opposite the gear teeth 410, the drilled holes are continued through the gear blank 422. Four brads of suitable length and diameter are inserted through the nut and then the gear blank 422. The brads, nut, and gear blank 422 are epoxied together, with care taken to keep the nut threads and the center hole free of epoxy. Any parts of the brads or epoxy extending beyond the tooth-side surface of the gear blank 422 are removed.

To assemble various parts into the finished weathervane 100, corrosion-resistant nuts and washers such as stainless steel can be used. The threaded shaft 406 is inserted through a washer. The inside diameter of the washer is just large enough to pass the threaded shaft 406 and has an outside diameter close to but no larger than the outside diameter of the splined portion 426. The threaded shaft 406 is then inserted through aperture 308 from the topside of the frame 302. With the gear teeth 410 pointing away from the underside of the top leg of the frame 302, the driver gear 404 is threaded on to the threaded shaft 406 up to approximately 1/32" from the underside of the top leg of the frame 302 and the gear teeth 410 are aligned with the splines 408 and keyways 424 of the splined portion 426 on the driver gear shaft 402. The purpose of this alignment is to coordinate the rotational positions of the gear teeth on all three gears 210, 414, 404 with the rotational alignment of the vane 102 and the roller 106 which are at opposite ends of the gear train.

The splined driver gear shaft 402 includes a splined portion 426 which comprises sixteen parts, namely, eight splines 408 and eight keyways 424 to match the sixteen teeth 410 of the driver gear 404. When the idler gear 414 has an odd number of teeth, the splines 408 and keyways 424 of the splined portion 426 should align with the gear teeth 410 on the driver gear 404 so as to ultimately allow the correct rotational position for the direction indicators 212, 214, 216, 218. When the idler gear 414 has an even number of teeth, then the splines 408 and keyways 424 of the splined portion 426 will be aligned with the spaces between the gear teeth 410 of the driver gear 404 to achieve the same function.

While maintaining the correct alignment, a nut preceded by a lock washer is threaded onto the threaded shaft 406 and tightened against the driver gear 404 to secure it solidly on the splined driver gear shaft 402. The nut's thickness may have to be thinned to maintain clearance with the roller cylinder 208. The splined driver gear shaft 402 should turn freely inside the frame 302 with no more than 1/32" vertical play. The length of the 1/4" aluminum round to be used to construct the roller axle 304 is determined as the outside width of the frame 302 plus 5/8", allowing 5/16" of the axle 304 to extend beyond each side of the frame 302. Each end of the roller axle 304 that extends beyond the frame 302 is drilled through its width so that the roller axle 304 can be secured in the frame 302 with cotter pins 306 when assembled. Any other proper locking mechanism known to a person of ordinary skill in the art can be used to secure the roller axle 304.

Using the roller axle 304 to temporarily mount the unpainted display roller 106 in the frame 302, a test fit is done to locate the idler gear axle aperture 310. The display roller 106 and any spacer washers that are needed at each end of the display roller 106 to center it horizontally in the frame 302 are assembled with the roller axle 304 inserted through the roller axle aperture on the side leg of the frame 302, display roller 106, and a spacer washers. The display roller 106 is mounted and centered inside the frame 302. With the display roller 106 temporarily mounted, the location of the idler gear axle aperture 310 is determined as the point on the top leg of the frame 302 halfway between the horizontal pitch circle of the driver gear 404 and the vertical plane of the roller gear 210. After removing the display roller 106 from the frame 302, the aperture 310 of 3/8" in diameter is drilled through the top leg of the frame 302 at the located point. The aperture 310 is 2 1/16" from the aperture 308, measured center to center.

The distance between the pitch circle of the driver gear 404 and the vertical plane of the roller gear 210 is the diameter of the pitch circle for the idler gear 414. In the illustrative embodiment, the pitch circle of the idler gear 414 is approximately 1 15/16" in diameter which is slightly smaller than the pitch circle diameter of the sixteen tooth driver gear 404. Accordingly, a fifteen tooth idler gear 414 provides a proper tooth spacing to mesh with and transfer movement from the driver gear 404 to the roller gear 210. To provide a sufficient tooth length of 5/16", the outside diameter of the idler gear 414 is configured to be 2 1/4"; and the root circle diameter is configured to be 1 5/8". The exact pitch circle of the idler gear 414 need not be marked and is self-adjusting. A circle with the diameter of 2 1/4" is marked out on 1/16" thick aluminum sheet delineating the gear blank of the idler gear 414. A concentric inner circle of 1 5/8" diameter is marked delineating the root circle. Fifteen equally spaced points are located around the circumference of the gear blank and fifteen radial lines are marked at those points to indicate the centers of the gear teeth. The gear blank is cut out of the sheet. The gear teeth of the idler gear 414 are formed to a triangular-type shape. A center hole of 3/8" diameter is drilled through the gear.

To attach the idler gear 414 to the frame 302, temporarily remove the unpainted display roller 106. The idler gear axle 412 is inserted through the center hole of the idler gear 414 and then through a washer followed by a lock-nut (not shown). The lock-nut is screwed down to just touch the washer but not tight. The idler gear 414 should turn freely around the axle 412 but with minimal wobble. The idler gear axle 412 is placed up through the aperture 310 from the underside of the top leg of the frame 302. A nut, referred to here as the top nut (not shown) is threaded onto the axle 412 which extends through the top leg of the frame 302. The top nut is screwed down firmly to secure the axle 412 to the frame 302.

An alternate method of making the idler gear axle 412, which eliminates the protrusion of the axle 412 above the frame 302, is to use a flathead screw inserted from the top leg of the frame 302 into a countersunk hole so that the screw head is flush with the frame 302. A nut is then threaded onto the screw and tightened against the frame 302. The idler gear 414 is then slipped onto the screw/axle with spacer washers (if needed) followed by a locknut threaded on just far enough to stabilize the gear 414 but allowing it to turn freely around the axle 412.

The horizontal teeth of the idler gear 414 mesh with the vertical teeth 410 of the driver gear 404 at approximately the midpoint of their lengths. The two gears 404 and 414 turn freely in coordination with each other. The tooth shape and spacing between the teeth of the idler gear 414 can be adjusted by filing so that suitable meshing can occur with the driver gear 404. Remount the roller 106. The elevation of the idler gear 414 is configured such that the teeth of the gear 414 mesh efficiently with both the teeth 410 and the teeth 222.

With the fitting completed, the unpainted display roller 106 is removed from the frame 302 for the direction indicators 212, 214, 216, 218 to be delineated and painted. Each of the eight separation lines bisects the space between two adjacent gear teeth 222 of the gear 210 such that four of the thirty-two gear teeth 222 are within each direction indicator (also referred to herein as direction sections). The order of the direction indicator colors need to be in the same order as the directions that the vane 102 rotates through. Mount the section-marked display roller 106 in the frame 302 such that the roller gear 210 is enmeshed in the gear train with the middle tooth space of the top section aligned with both the frame 302 and a keyway 424 of the splined driver gear shaft 402 such that one pair of opposite display indicators is in the horizontal plane. Any one of the four cardinal directions can be chosen as the horizontal pair. Then, the chosen direction is marked on the pair of direction indicators. Additionally, the aligning keyway 424 is also marked. The marked keyway 424 represents the cardinal direction that the vane 102 points to. Thereafter, the splined driver gear shaft 402 is rotated ninety degrees before the next pair of opposite indicators (such as the two opposite indicators 214) is marked. The marking process is repeated until all the direction indicators are marked.

The display roller 106 is then removed from the frame 302; and the direction indicators 212, 214, 216, 218 are painted with colors and initial letters designating the directions assigned to them respectively. The painted display roller 106 is mounted in the frame 302, properly centered and enmeshed. As the middle and border-line tooth spaces of each display indicator receive an idler gear 414 tooth when rotating through engagement at top center, they are simultaneously aligned with the keyways 424 of the splined driver gear shaft 402. In this illustrative embodiment, the idler gear 414 has an odd number of teeth, therefore the sixteen parts that compose the splined portion 426, namely eight splines 408 and eight keyways 424 are aligned with the sixteen teeth 410 of driver gear 404. If the idler gear 414 has an even number of teeth, the splines 408 and keyways 424 of the splined portion 426 would be aligned with the spaces between the teeth 410 of the driver gear 404. Such alignment provides correct coordination of the direction indicators of the display roller 106 with the direction of the vane 102.

The keyed vane mount 112 connects the vane 102 to the splined driver gear shaft 402 thereby transferring the motion of the vane 102 to the gear train. A bottom view of the keyed vane mount 112 is illustrated by reference to FIG. 5. The keyed vane mount 112 comprises a pair of opposing flanged semi-cylinders 504, a pair of drip edges 118, a pair of keys 502, and a split cap 120. Each of the two flanged semi-cylinders 504 is composed of a semi-cylinder 504 and two longitudinal flanges 116 in plane with each other. The drip edges 118 and cap 120 help prevent or reduce the amount of rain or snow that might enter the housing 104 through aperture 326. The portion of the keys 502 extending into the inside of the cylinder formed by the flanged semi-cylinders 504 are received by a pair of keyways 424 on the splined portion 426 when assembled.

Figure 5:
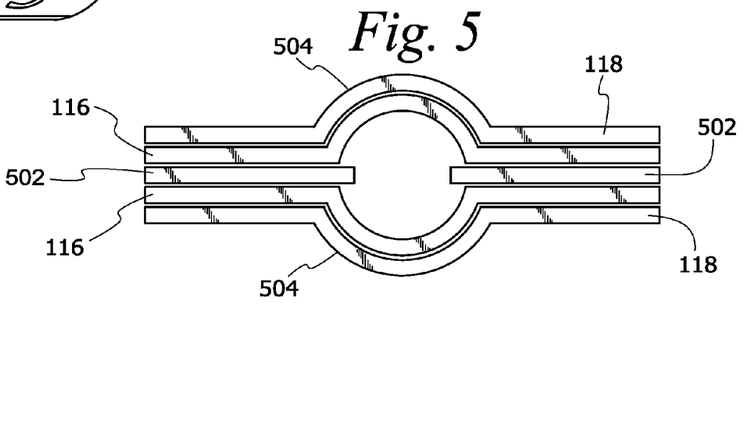
FIG. 5 is a bottom view of a keyed vane mount in accordance with this disclosure.

When assembled the two flanged semi-cylinders 504 form two pairs of opposing flanges 116 and a single cylinder 1⅞" in height. Each of the two pairs of opposing flanges 116 sandwich between them one ⅛" thick key 502. The two keys 502 are 180 degrees apart and extend into the cylinder ⅛" from opposite sides so as to interface with the keyways 424 of the splined portion 426 when assembled. To accommodate the ⅛" thickness of the keys 502 each center radius of the flanged semi-cylinders 504 is undersized by 1/16". The inside diameter of the completed cylinder is just slightly larger than the outside diameter of the splined portion 426 so as to allow a close yet easy slip fitting, with the keys 502 fitting closely but easily into opposite keyways 424 of the splined portion 426 when assembled.

The outside diameter of the splined portion 426 is 15/16" and the inside diameter of the keyed vane mount 112 is 31/32". To form the keyed vane mount 112, each of two 1⅞" long pieces of 1" O.D. aluminum tube with an I.D. of 29/32" is split lengthwise and bent open to form a slightly undersized semi-cylinder 504 with two ¾" wide full-length longitudinal flanges 116, one on either side of the semi-cylinder 504 in plane with each other 180 degrees apart. The overall width of the flanged semi-cylinders is 2⅝". The flanges 116 as measured from the outside of the semi-cylinder are ¾" wide. The keys 502 of the keyed vane mount 112 are two ⅛" thick aluminum rectangles /15;16" wide with a height slightly less than the height of the splined portion 426 as measured from the top of the housing 104. The splined portion 426 with a washer is 1" tall so the keys 502 are 15/16" in height. The flanged semi-cylinders 504 are brought together so as to sandwich one key 502 between each pair of opposing flanges 116.

The keys 502 are positioned to be flush to one end of the flanges 116 and protruding into the cylinder of the keyed vane mount 112 one-eighth inch each from opposite sides. The parts are secured together with two rivets through each of the sandwiched keys 502 with the rivets placed no less than ⅜" from the flush end. There is a ⅛" wide gap between the opposing flanges 116 for the remainder of their length. The distance between the keys 502 is ¾" and the distance between opposite keyways 424 of the splined portion 426 is ⅝". In addition, one ⅛" thick drip edge 118 is attached around and flush with the keyed end of the flanged semi-cylinder 504. The drip edges 118 are made from two ⅜" wide strips of ⅛" thick aluminum, each formed to the same shape as the outside of the flanged semi-cylinder 504 and attached in place with rivets through the flanges 116 and keys 502. The lower half of the flanges 116 and the drip edges 118 are tapered so that the base or the keyed end of the keyed vane mount 112 presents less resistance to snow accumulation on the top of the housing 104. The end of the cylinder opposite the keys 502 is capped with a 1/16" thick piece of aluminum.

The cap 120 is shaped to the outside diameter of the cylinder and has four small square tabs bent down the top outside of the cylinder of the keyed vane mount 112. Additionally, the cap piece is attached to the cylinder with rivets through the tabs. The cap 120 is then cut in line with the gap between the opposing flanges 116 into two halves. The cut between these two halves should be close to 1/16" wide to match the thickness of the vane 102. The cut opens up a mounting slot for the vane 102 of a depth of ⅞" to the top of the splined portion 426 when the keyed vane mount is in place on the splined driver gear shaft 402. Two ¼" diameter screw holes are drilled through the opposing flanges 116 for attaching the keyed vane mount 112 to the vane 102 with ¼-20 screws. Each of the two holes is near the center of the upper half of each pair of the opposing flanges 116 so that the vane 102 can be secured in the mounting slot.

Various materials, metallic and non-metallic, can be used to make the vane 102. The vane 102 can also be constructed into different shapes, forms and styles, as a fish profile. In the illustrative embodiment, the vane 102 is cut from 1/16" thick aluminum sheet. The vane 102 is designed to encircle the housing 104 vertically. However, it is not required for the vane 102 to encircle the housing 104 to practice the present teachings. However, with the vane 102 encircling the housing 104, the weather vane 100 is stable because its center of gravity is below its upper pivot point and the lateral pressure of the vane 102 is controlled from stressing the splines 408 of the splined driver gear shaft 402. Since the vane 102 points towards the direction that wind is coming from, the head of the fish profile is the pointing end while the tail of the fish profile is the trailing end with greater surface area to catch wind.

The top portion of the encircling vane 102 connects to the splined driver gear shaft 402 by means of the keyed vane mount 112. The bottom portion of the vane 102 loosely but closely brackets the mounting post 108 below the housing 104 so that the vane 102 pivots around its vertical axis both above and below the housing 104. The inside perimeter of the encircling vane 102 is large enough for the vane 102 to rotate clear of the housing 104 on all sides. Additionally, the vane 102 provides a vertical clearance that is enough for the vane 102 to be raised up on the mounting post 108, and the keyed vane mount 112 to be raised clear of the splined portion 426 of the splined driver gear shaft 402. The clearance is necessary when the weathervane 100 is oriented for proper functioning. In addition, sufficient amount of vertical clearance between the upper portion of the vane 102 and the top of the housing 104 reduces resistance to snow accumulation when present.

It is desirable that the trailing end of the vane 102 has greater surface area exposed to wind than the pointing end to cause the vane 102 to pivot in reaction to a change in wind direction. Therefore, the vertical axis around which the vane 102 rotates is not necessarily the center of the weight of the vane 102. The trailing end usually has more weight than the pointing end. For proper functioning, the greater weight of the trailing end must be balanced by adding weight to the pointing end. To balance the vane 102 and simultaneously locate its mounting points, the vertical axis of the vane 102 is first determined with consideration as to the clearance needed between the vane 102 and the housing 104. The vertical axis determines the location of the upper and lower pivot points which are also the mounting points of the vane 102.

In one implementation, the vane 102 is laid with both pivot points directly on a fulcrum and then weighed with lead strips placed on the pointing end within the designed shape of the vane 102 until it is level. When the proper balance is achieved, the lead strips are evenly distributed on either side of the pointing end and permanently attached in position with rivets. The lower pivot point on the encircling vane 102 is the location of a two-piece bracket to loosely but closely capture the mounting post 108. The bracket is formed from two rectangular pieces of 1/16" thick aluminum sheet. In this illustrative embodiment, a larger bracket piece is 3½" wide and 1½" in height. It is formed to be a semi-cylinder shape along its height in the center of its width. Additionally, it is sized to fit closely but loosely around half the thickness of the mounting post 108, and have equal-width longitudinal flanges on either side of the semi-cylinder that lay flat against the vane 102. The larger bracket piece is laid flat against the vane 102 and centered over the marked lower pivot point and attached with rivets located in the outer ½" width of both flanges.

With the larger bracket piece permanently attached over the lower pivot point, the lower pivot point area is cut out of a width to match the diameter of the bracket piece semi-cylinder. The smaller bracket piece is the same dimension in height as the larger bracket piece, and is 2½" in width. It is shaped to the same flanged semi-cylinder shape as the larger bracket piece. At installation time, the smaller bracket piece is attached on the opposite side of the vane 102 from the larger bracket piece with machine screws through each of its flanges and threaded through the vane 102 and the larger bracket piece when the vane 102 is mounted. To complete the assembly of the weathervane 100, the keyed vane mount 112 is keyed into the keyways 424 of the splined driver gear shaft 402. With the smaller bracket piece removed, the upper pivot point area of the vane 102 is placed to rest centered upon the top of the splined driver gear shaft 402.

The inside surface of the larger bracket piece makes contact with the mounting post 108. Using paper as a gap gauge, the keyed vane mount 112 is raised very slightly off the surface of the housing 104 so as to just break contact. With the parts in this position, the vane 102 is marked through mounting holes, removed and drilled to the same ¼" diameter holes as the mounting holes in the keyed vane mount 112. The vane 102 and the keyed vane mount 112 are attached together with two ¼-20 stainless steel pan head machine screws of sufficient length, one screw with stainless steel washer through each of the mounting holes of the opposing flanges 116 and the vane 102 between them. The vane 102 and the keyed vane mount 112 are then secured with a stainless steel nut and washer. A smaller bracket piece is then attached in place to capture the mounting post 108.

Obviously, many additional modifications and variations of the present disclosure are possible in light of the above teachings. Thus, it is to be understood that, within the scope of the appended claims, the disclosure may be practiced otherwise than is specifically described above. For example, the weathervane 100 and its various components, such as the roller 106, can be constructed in different sizes, shapes and/or materials. The colors of the direction indicators 212, 214, 216, 218 can be in different colors and different color arrangements. As an additional example, a different motion transfer system can be used to implement the present teachings. In one alternate implementation, the idler gear 414 is not required or additional idler gears are used. As a further example, the housing 104 can be made or constructed without the frame 302. Alternatively, the housing 104 can be made or constructed without the top cover 322 or the two bottom covers 362, 364.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below.

What is claimed is:

1. A weathervane for indicating wind directions, the weathervane comprising:
  i) a housing mounted to a supporting member wherein the housing includes an opening;
  ii) a wind direction display roller enclosed by and rotatably mounted to the housing, wherein the display roller comprises a plurality of wind direction indicators wherein at least one of the plurality of wind direction indicators is visible through the opening;
  iii) a vane; and
  iv) a motion transfer system operatively coupled to the vane and the display roller, wherein the display roller is rotated by the vane through the motion transfer system.

2. The weathervane of claim 1 wherein the vane encircles the display roller.

3. The weathervane of claim 1 wherein the plurality of wind direction indicators comprises four pairs of wind direction indicators wherein each pair of wind direction indicators indicate a same cardinal direction of West, South, East or North.

4. The weathervane of claim 3 wherein the four pairs of wind direction indicators are in four different colors.

5. The weathervane of claim 4 wherein each of the plurality of wind direction indicators extends on the side surfaces of the display roller.

6. The weathervane of claim 5 wherein at least one of the plurality of wind direction indicators is visible from all horizontal directions.

7. The weathervane of claim 5 wherein the opening comprises a front portion, a rear portion and two side portions wherein each side portion includes two sector portions wherein each sector portion has a sector central angle of 45 degrees.

8. The weathervane of claim 3 wherein each of the plurality of wind direction indicators comprises two same alphabet letters indicating a cardinal direction wherein one of the two same letters is shown upside down.

9. The weathervane of claim 1 wherein the housing includes a frame, wherein the vane is rotatably coupled to the frame and the post.

10. The weathervane of claim 1 wherein the motion transfer system comprises a driver gear operatively coupled to the vane and a roller gear wherein the roller gear is mounted to the displayer roller and wherein the turn ratio between the driver gear and the roller gear is 2:1.

11. The weathervane of claim 1 wherein the motion transfer system further comprises an idler gear operatively coupled to the driver gear and the roller gear.

12. The weathervane of claim 1 wherein the housing includes a frame where the wind direction display roller is rotatably mounted to the frame.

* * * * *